(12) United States Patent
Yun

(10) Patent No.: US 12,250,895 B2
(45) Date of Patent: Mar. 18, 2025

(54) PLATFORM SERVER AND METHOD FOR PROVIDING DISEASE AND PEST TREATMENT RECIPES

(71) Applicant: SHERPA SPACE INC., Daejeon (KR)

(72) Inventor: Choa Mun Yun, Daejeon (KR)

(73) Assignee: SHERPA SPACE INC., Daejeon (KR)

( * ) Notice: Subject to any disclaimer, the term of this patent is extended or adjusted under 35 U.S.C. 154(b) by 508 days.

(21) Appl. No.: 17/404,439

(22) Filed: Aug. 17, 2021

(65) Prior Publication Data

US 2022/0071081 A1 Mar. 10, 2022

(30) Foreign Application Priority Data

Sep. 10, 2020 (KR) .......................... 10-2020-0116054
Mar. 4, 2021 (KR) .......................... 10-2021-0028595

(51) Int. Cl.
*A01B 79/00* (2006.01)
*A01C 21/00* (2006.01)
*G06T 7/00* (2017.01)

(52) U.S. Cl.
CPC .......... *A01B 79/005* (2013.01); *A01C 21/005* (2013.01); *G06T 7/0008* (2013.01); *G06T 2207/30108* (2013.01)

(58) Field of Classification Search
CPC ... A01B 79/005; A01C 21/005; G06T 7/0008; G06T 2207/30108
See application file for complete search history.

(56) References Cited

U.S. PATENT DOCUMENTS

2020/0364843 A1* 11/2020 Stueve ................. G06V 10/764

FOREIGN PATENT DOCUMENTS

KR 1020200057839 A 5/2020

\* cited by examiner

*Primary Examiner* — Vu Le
*Assistant Examiner* — Lei Zhao
(74) *Attorney, Agent, or Firm* — Harvest IP Law, LLP

(57) ABSTRACT

The present disclosure relates to a technology for providing high-quality treatment recipes that are optimized to the cultivation environment and to the disease or pest problem that has occurred. A platform server and method for providing disease and pest treatment recipes according to an embodiment of the present disclosure includes: an information collector configured to receive the image of a crop and information on the cultivation environment; an image analyzer configured to identify the disease or pest problem based on the image of the crop; and a recipe recommender configured to search a multiple number of treatment recipes from a recipe database based on the identified disease or pest problem and the information on the cultivation environment and provide the searched treatment recipes together with suitability ratings to a user.

9 Claims, 9 Drawing Sheets

PLATFORM SERVER AND METHOD FOR PROVIDING DISEASE AND PEST TREATMENT RECIPES

CROSS-REFERENCE TO RELATED APPLICATIONS

This application claims the benefit of Korean Patent Application No. 10-2020-0116054, filed with the Korean Intellectual Property Office on Sep. 10, 2020, and Korean Patent Application No. 10-2021-0028595, filed with the Korean Intellectual Property Office on Mar. 4, 2021. The disclosures of the above patent applications are incorporated herein by reference in their entirety.

BACKGROUND

1. Technical Field

The present disclosure relates to a technology for providing a treatment recipe for pest and disease and pest control, more particularly to a platform server and method for providing high-quality disease and pest treatment recipes that are optimized to the cultivation environment and the disease or pest problem by identifying the disease or pest problem based on images of the crop, providing the user with a listed treatment recipe based on a suitability rating calculated with comprehensive consideration of the identified disease or pest problem and the cultivation environment, and reevaluating the suitability rating of the treatment recipe based on the treatment progress analyzed from the crop to which the treatment recipe has been applied.

2. Description of the Related Art

Generally, disease and pest problems in plants may be divided into disease-related problems and pest-related problems. Disease-related problems may involve reductions in harvest yield or quality due to microorganisms causing withering and decaying in farm produce and any type of beneficial plants, including crops, vegetables, fruit trees, flowers, lumber trees, etc. Pest-related problems may involve damage resulting from insects eating the plants or absorbing their nutrients. Here, insects that cause damage to the plants may be designated as pests.

Disease-related problems may be caused by a pathogen living parasitically within a plant and may entail fast propagation and a large area of damage. The extent of damage from a disease-related problem may vary greatly depending on the type of pathogen, the type and variety of the crop, the time at which the problem began, and weather conditions. The types of pathogens may include fungi, bacteria, mycoplasmas, viruses, viroids, etc. The types of pests may include ticks and nematodes as well as insects, where different types of pests may incur damage in different ways.

In the related art, a chemical would be sprayed only after a disease or pest problem is visibly discernible, and the spraying of the chemical would not provide adequate results, since the problem would have progressed to an advanced state. Also, as there is no consideration of spraying different types of chemicals, spraying the chemicals in different dilution ratios, or using different control methods according to the degree of progression of the disease or pest problem, the cost of the disease/pest control and the amounts of chemical substances used would be high.

Furthermore, such an invariable control method (spraying a chemical) that does not consider the type of disease or pest problem, the degree of progression, and the cultivation environment is not only unable to provide a fast treatment of the disease or pest problem but also incur problems of harming the crops or causing soil contamination due to an excessive use of chemicals.

SUMMARY OF THE INVENTION

The present disclosure is proposed to resolve the problems described above, and an objective of the present disclosure is to provide a platform server and method for providing disease and pest treatment recipes that can identify a disease or pest problem based on images of the crop and provide the user with a listed treatment recipe based on a suitability rating calculated with comprehensive consideration of the identified disease or pest problem and the cultivation environment.

Another objective of the present disclosure is to provide a platform server and method for providing disease and pest treatment recipes that can provide high-quality disease and pest treatment recipes that are optimized to the cultivation environment and the disease or pest problem by reevaluating the suitability rating of a treatment recipe based on the treatment progress analyzed from the crop to which the treatment recipe has been applied.

Other objectives of the present disclosure will be more clearly understood from the embodiments set forth below.

A platform server for providing disease and pest treatment recipes according to a first aspect of the present disclosure includes: an information collector configured to receive the image of a crop and information on the cultivation environment; an image analyzer configured to identify the disease or pest problem based on the image of the crop; and a recipe recommender configured to search a multiple number of treatment recipes from a recipe database based on the identified disease or pest problem and the information on the cultivation environment and provide the searched treatment recipes together with suitability ratings to a user.

The platform server for providing disease and pest treatment recipes according to the first aspect of the present disclosure further includes: a crop monitor configured to periodically receive images of the crop to which the treatment recipe selected by the user is being applied; and a recipe evaluator configured to derive a treatment result associated with a treatment progress by way of a time series analysis of the images of the crop and evaluate the suitability rating of the treatment recipe stored in the recipe database based on the derived treatment result and the information on the cultivation environment of the crop.

The treatment recipe includes at least one of manufacturer, brand name, dilution rate, dosage amount, and dosage period of a chemical or fertilizer.

The information on the cultivation environment includes at least one of the number of days since sowing, a designation regarding soil cultivation or water cultivation, the acidity (pH) of the soil, the humidity of the soil, the composition of the culture solution, the concentration of the culture solution, the acidity (pH) of the culture solution, the luminous flux, the illuminance, the optical wavelengths, the temperature of the atmosphere, the humidity of the atmosphere, and the ventilated air volume.

The treatment result includes at least one of the stress reduction rate, the pathogen reduction rate, and the growth rate of the crop experiencing a disease or pest problem.

The suitability rating of the treatment recipe can be calculated based on criteria categories including a cure rate, a duration until cure, and a cost, where weights can be applied to the criteria categories.

A method for providing disease and pest treatment recipes according to a second aspect of the present disclosure includes: an information collector configured to receive the image of a crop and information on the cultivation environment; an image analyzer configured to identify the disease or pest problem based on the image of the crop; a recipe recommender configured to search a multiple number of treatment recipes from a recipe database based on the identified disease or pest problem and the information on the cultivation environment and provide the searched treatment recipes together with suitability ratings to a user; a problem controller configured to apply the treatment recipe selected by the user, from among the multiple number of treatment recipes provided to the user, to the crop; a crop monitor configured to periodically receive images of the crop to which the treatment recipe selected by the user is being applied; and a recipe evaluator configured to derive a treatment result associated with a treatment progress by way of a time series analysis of the images of the crop and evaluate a suitability rating of the treatment recipe stored in the recipe database based on the derived treatment result and the information on the cultivation environment of the crop.

The treatment recipe includes at least one of manufacturer, brand name, dilution rate, dosage amount, and dosage period of a chemical or fertilizer.

The information on the cultivation environment includes at least one of the number of days since sowing, a designation regarding soil cultivation or water cultivation, the acidity (pH) of the soil, the humidity of the soil, the composition of the culture solution, the concentration of the culture solution, the acidity (pH) of the culture solution, the luminous flux, the illuminance, the optical wavelengths, the temperature of the atmosphere, the humidity of the atmosphere, and the ventilated air volume.

The treatment result includes at least one of the stress reduction rate, the pathogen reduction rate, and the growth rate of the crop experiencing a disease or pest problem.

The suitability rating of the treatment recipe can be calculated based on criteria categories including a cure rate, a duration until cure, and a cost, where weights can be applied to the criteria categories.

A method for providing disease and pest treatment recipes according to a third aspect of the present disclosure includes: a platform server receiving the image of a crop and information on the cultivation environment and identifying the disease or pest problem based on the image of the crop; the platform server searching a multiple number of treatment recipes from a recipe database based on the identified disease or pest problem and the information on the cultivation environment and providing the searched treatment recipes together with suitability ratings to a user; the platform server periodically receiving images of the crop to which the treatment recipe selected by the user is being applied; the platform server deriving a treatment result associated with a treatment progress by way of a time series analysis of the images of the crop; and the platform server evaluating a suitability rating of the treatment recipe stored in the recipe database based on the derived treatment result and the information on the cultivation environment of the crop.

The treatment recipe includes at least one of manufacturer, brand name, dilution rate, dosage amount, and dosage period of a chemical or fertilizer.

The information on the cultivation environment includes at least one of the number of days since sowing, a designation regarding soil cultivation or water cultivation, the acidity (pH) of the soil, the humidity of the soil, the composition of the culture solution, the concentration of the culture solution, the acidity (pH) of the culture solution, the luminous flux, the illuminance, the optical wavelengths, the temperature of the atmosphere, the humidity of the atmosphere, and the ventilated air volume.

The treatment result includes at least one of the stress reduction rate, the pathogen reduction rate, and the growth rate of the crop experiencing a disease or pest problem.

The suitability rating of the treatment recipe can be calculated based on criteria categories including a cure rate, a duration until cure, and a cost, where weights can be applied to the criteria categories.

An embodiment of the present disclosure can identify the disease or pest problem based on images of the crop and provide a list of treatment recipes based on suitability ratings that are calculated using the identified disease or pest problem as well as the cultivation environment, thus making it possible to provide treatment recipes that are optimized to the cultivation environment and the disease or pest problem.

An embodiment of the present disclosure can reevaluate the suitability rating of a treatment recipe based on the treatment result analyzed from a crop to which the treatment recipe was applied, thus making it possible to provide high-quality treatment recipes that are optimized to the cultivation environment and the disease or pest problem.

The effects of the present disclosure are not limited to those mentioned above, and other effects that are not mentioned above would be clearly apparent to the skilled person from the descriptions provided below.

DETAILED DESCRIPTION OF THE INVENTION

Figure 1:
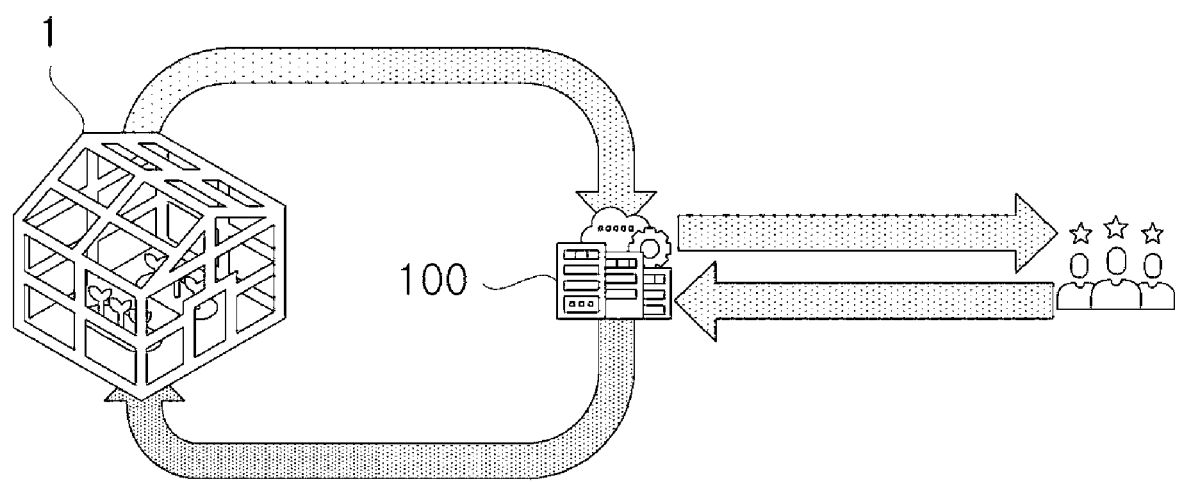
FIG. 1 is a conceptual diagram illustrating a platform server for providing disease and pest treatment recipes according to a first disclosed embodiment of the present disclosure.

As the present disclosure allows for various changes and numerous embodiments, particular embodiments will be illustrated in the drawings and described in detail in the written description. However, this is not intended to limit the present disclosure to particular modes of practice, and it is to be appreciated that all changes, equivalents, and substitutes that do not depart from the spirit and technical scope of the present disclosure are encompassed by the present disclosure.

In the description of the present disclosure, certain detailed explanations of the related art are omitted if it is deemed that they may unnecessarily obscure the essence of the present disclosure.

The terms used in the present specification are merely used to describe particular embodiments and are not intended to limit the present disclosure. An expression used in the singular encompasses the expression of the plural, unless it has a clearly different meaning in the context. In the present specification, it is to be understood that terms such as "including" or "having," etc., are intended to indicate the existence of the features, numbers, steps, actions, components, parts, or combinations thereof disclosed in the specification and are not intended to preclude the possibility that one or more other features, numbers, steps, actions, components, parts, or combinations thereof may exist or may be added.

Unless defined otherwise, all terms used herein, including technical or scientific terms, have the same meanings as those generally recognized by the person having ordinary skill in the relevant field of art. Terms such as those that are defined in generally used dictionaries are to be interpreted as having meanings that agree with the context of the relevant technology and are not to be interpreted as having idealistic or excessively formal meanings unless clearly defined within the specification.

The term "module" used in the specification refers to a unit that processes a particular function or operation and can represent hardware, software, or a combination of hardware and software.

While such terms as "first" and "second," etc., can be used to describe various components, such components are not to be limited by the above terms. The above terms are used only to distinguish one component from another.

Certain embodiments of the present disclosure will be described below in more detail with reference to the accompanying drawings. Those components that are the same or are in correspondence are rendered the same reference numeral, and redundant descriptions are omitted.

First Disclosed Embodiment

Below, a platform server 100 for providing disease and pest treatment recipes according to a first disclosed embodiment of the present disclosure is described in detail with reference to the accompanying drawings.

FIG. 1 is a conceptual diagram illustrating a platform server 100 for providing disease and pest treatment recipes according to a first disclosed embodiment of the present disclosure.

Referring to FIG. 1, a platform server 100 for providing disease and pest treatment recipes according to the first disclosed embodiment may receive images of a crop and information regarding the cultivation environment of the crop and, based on the images, may identify the type of disease or pest problem and the degree of progression. Based on the identification of the disease or pest problem type and on the information provided regarding the cultivation environment, a multiple number of treatment recipes suitable for treating the disease or pest problem may be searched from a recipe database and provided to the user (customer).

The platform server 100 for providing disease and pest treatment recipes can help the user to easily select an optimal treatment recipe from among the multiple number of treatment recipes by providing a suitability rating, representing suitability in regard to the disease or pest problem that has occurred at the cultivation site 1 and the cultivation environment of the cultivation site 1, together with each treatment recipe. Here, the suitability rating of a treatment recipe may be calculated in consideration of the cultivation environment, cure rate, duration until cure, cost, etc., making it possible to quickly treat a disease or pest problem that has occurred in a crop by using a treatment recipe optimized to the cultivation environment.

In this embodiment, a treatment recipe pre-stored in the recipe database may include, but is not necessarily limited to, information regarding at least one of a chemical, pesticide, fertilizer, or other agrochemical product and the dosage amount, dosage method, dosage period, and dilution rate of the product. For example, the treatment recipes include the manufacturers and brand names of the respective products. Also, a treatment recipe can be stored together with the cultivation environment information to which the treatment method is applied.

Furthermore, in addition to methods that use chemical substances such as chemicals or pesticides as described above, treatment recipes may include methods of treating a crop by using physical or biological changes in the cultivation environment. For example, a treatment recipe using physical changes may present an optimal temperature for controlling a disease or pest problem in cases where the disease or pest problem is vulnerable to temperatures of a certain range. For example, a treatment recipe using physical changes may be a supply of water, a change of water supply or a change of water supply cycle.

In this embodiment, the disease and pest problems are not limited to any one type. For example, a disease-related problem can involve any one of fungi, bacteria, mycoplasmas, viruses, and viroids, while a pest-related problem can involve any one of mites, lac insects, lice, wasps, lace bugs, and gnats. Of course, these are provided merely as examples, and the invention is not limited by the above examples.

This embodiment is described using an example in which the treatment recipes are for treating a disease or pest problem occurring in a crop, but the invention is not thus limited. For example, subjects to which treatment recipes may be applied includes animals, algae, fish, etc., as well as crops (i.e., plants).

Figure 2:
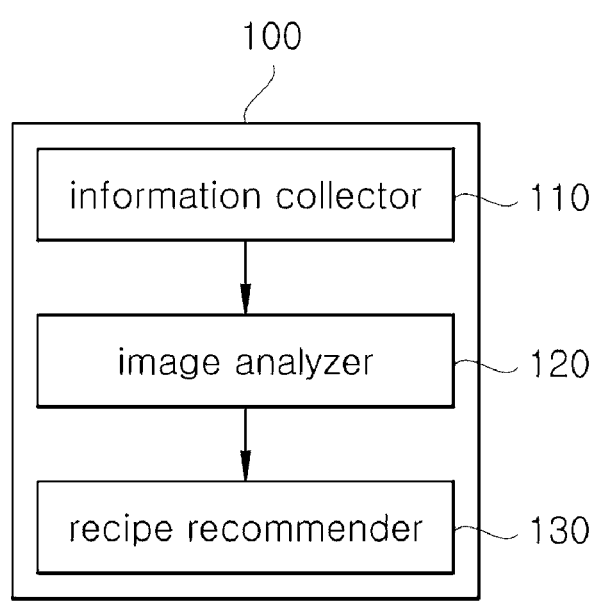
FIG. 2 is a block diagram illustrating the composition of a platform server for providing disease and pest treatment recipes according to the first disclosed embodiment.

FIG. 2 is a block diagram illustrating the composition of a platform server 100 for providing disease and pest treatment recipes according to the first disclosed embodiment.

Referring to FIG. 1 and FIG. 2, a platform server 100 for providing disease and pest treatment recipes according to the first disclosed embodiment may include an information collector 110, an image analyzer 120, and a recipe recommender 130.

The information collector 110 may receive images of the crop planted at the cultivation site 1 and information on the cultivation environment at the cultivation site 1.

First, the information collector 110 may be provided with an image of the crop photographed by a camera device (not depicted in the drawing) installed at the cultivation site 1.

At least one or more camera device (not depicted in the drawing) may be installed at the cultivation site 1 of the crop, and the camera device (not depicted in the drawing) may photograph the crop in preconfigured cycles. The camera device (not depicted in the drawing) may take still images or video clips of the overall crop or a portion of the crop (for example, the front surface of a leaf, the rear surface of a leaf, the stalk, etc.). The camera device (not depicted in the drawing) can selectively apply any of a variety of filters in photographing the crop.

The following provides examples of methods that the camera device (not depicted in the drawing) may use for photographing the crop.

The camera device (not depicted in the drawing) may photograph the crop by using at least one image sensor of an RGB sensor, a thermal imaging sensor, a CCD sensor, and a multispectral sensor.

An RGB sensor may combine red, green, and blue colors to express an image, a thermal imaging sensor may show a subject using different colors to represent different temperatures, and a CCD sensor may obtain an image by converting light to electrical charges. A multispectral sensor may obtain images in generally ten or fewer discontinuous bands within the visible ray and infrared regions.

The camera device (not depicted in the drawing) and the information collector 110 can exchange signals using near-field communication such as Bluetooth, Wi-Fi, Zigbee, etc., or broadband wireless communication such as LoRa, 4G LTE, 5G mobile communication, etc.

The information collector 110 may receive information on the cultivation environment at the cultivation site 1 where the crop is being cultivated. Here, the information regarding the cultivation environment may include at least one of the number of days since sowing, a designation regarding soil cultivation or water cultivation, the acidity (pH) of the soil, the humidity of the soil, the composition of the culture solution, the concentration of the culture solution, the acidity (pH) of the culture solution, the luminous flux, the illuminance, the optical wavelengths, the temperature of the atmosphere, the humidity of the atmosphere, and the ventilated air volume.

One reason for the information collector 110 receiving the information regarding the cultivation environment at the cultivation site 1 is to provide treatment methods that are optimized to the cultivation environment of the user by providing treatment recipes that are applied in environments most similar to the cultivation environment of the user. The information on the cultivation environment may be used basically in calculating the suitability ratings of treatment recipes that are applicable to the cultivation site 1 of the user.

The information collector 110 can receive information on the cultivation environment such as the above from various sensors installed at the cultivation site 1. For example, at least one of a temperature sensor, humidity sensor, optical sensor, gas sensor, and soil sensor may be installed at the cultivation site 1, and the information on the cultivation environment may be received from these sensors. Although this embodiment is described with the information collector 110 basically receiving information regarding the cultivation environment via various sensors, it is also possible for the information collector 110 to receive the information of the cultivation environment (such as the temperature and humidity at the cultivation site 1, for example) based on data inputted directly by the user.

The image analyzer 120 may identify the type and degree of progression of the disease or pest problem based on the images of the crop collected at the information collector 110.

For instance, the image analyzer 120 may determine the type of disease or pest problem and the degree of progression by using an image analysis algorithm or by comparing with pre-stored image data of the crop in a normal state. However, the method by which the image analyzer 120 determines the type of disease or pest problem and the degree of progression is not limited to the above.

The recipe recommender 130 may search multiple treatment recipes from a recipe database, based on the identified type and progression of the disease or pest problem and on the information regarding the cultivation environment, and may provide the user with the multiple searched treatment recipes together with their suitability ratings.

One reason for the recipe recommender 130 searching for multiple treatment recipes from the recipe database based on the type and progression of the disease or pest problem and on the information regarding the cultivation environment is because, even when the same chemical (such as a pesticide, for example) is used for the same type of disease or pest problem at the same degree of progression, the efficacy and effectiveness of the chemical included in treatment recipes can vary according to the cultivation environment, i.e., the type of cultivation (soil cultivation or water cultivation), the acidity (pH) of the soil, the humidity of the soil, the composition of the culture solution, the concentration of the culture solution, the acidity (pH) of the culture solution, the luminous flux, the illuminance, the optical wavelengths, the temperature of the atmosphere, the humidity of the atmosphere, and the ventilated air volume.

That is, in order to optimize the effect of the treatment recipe, the recipe recommender 130 may search multiple treatment recipes that were used to cure disease or pest problems in environments similar to the corresponding cultivation environment from the recipe database and may concurrently provide suitability ratings that represent how suitable the searched treatment recipes would be when used at the cultivation site 1 of the user.

In this embodiment, the treatment recipes may include at least one of a physical treatment method, a biological treatment method, and a chemical treatment method.

A physical treatment method includes adjusting at least one of the temperature, humidity, luminous flux, optical wavelengths, and ventilation cycle at the cultivation site 1. For example, a physical treatment method may present the optimal temperature for a disease or pest problem for cases in which the disease or pest problem is vulnerable to temperatures of a certain range.

A biological treatment method may include at least one of installing a screening, installing pheromone traps, introducing natural enemies or pest-repelling plants. A biological treatment method may entail blocking pests from approaching or luring pests to another location for eradication. For example, a screening can be installed around a crop to block pests from approaching, where a pest repellent can be coated on the exterior of the screening. A pheromone trap may be a device that uses a pheromone substance to lure and trap pests. A suitable pheromone trap can be used according to the behaviors of the targeted pest.

A chemical treatment method may include adjusting at least one of using a chemical, pesticide, fertilizer, or any of a variety of other agrochemical products, spraying an environment-friendly agent, and adjusting soil pH. A chemical treatment method may use a chemical, pesticide, fertilizer, or other agrochemical product or adjust the soil pH to directly remove a disease or pest problem or create an environment in which the disease or pest cannot survive.

Although the present embodiment is described using chemical treatment methods, from among the types of treatment methods listed above, as a basic example, it is not necessary that only chemical treatment methods be used.

The recipe recommender 130 may rate suitability ratings and provide these to the user by comparing the cultivation environment in which the crop to be treated for a disease or pest problem is planted with the cultivation environment in which each of the multiple searched treatment recipes was used.

For example, according to the disease or pest problem that has occurred in a crop and according to the cultivation environment, a first treatment recipe having a suitability rating of 70%, a second treatment recipe having a suitability rating of 75%, and a third treatment recipe having a suitability rating of 85% may be provided. Here, the treatment recipes can have their suitability ratings calculated differently, as the first treatment recipe includes a physical treatment method, and the second treatment recipe includes a chemical treatment method. Whereas the disease or pest problem that has occurred in the corresponding crop can be cured by applying the first treatment recipe of adjusting the temperature and humidity, in a case where the disease or pest problem has a high speed of contagion, the suitability rating of the second treatment recipe including a chemical treatment method may be calculated higher than that of the first treatment recipe including a physical treatment method due to the need for a quick countermeasure.

Thus, by providing treatment recipes with the suitability ratings included, the recipe recommender 130 can provide treatment recipes optimized to the cultivation environment and to the treatment of the disease or pest problem.

The suitability ratings of the treatment recipes provided to the user from the recipe recommender 130 may be calculated based on criteria categories including at least one of the cultivation environment, a cure rate, a duration until cure, and a cost.

For instance, when the cure rate is a criterion category, a treatment recipe having the highest cure rate from among multiple treatment recipes may not necessarily have the highest suitability rating. For example, in cases where a cure rate maintained up to 80% allows self healing even without further use of a chemical, a treatment recipe having a cure rate of 80% can have a higher suitability rating than a treatment recipe having a cure rate of 85%. In this embodiment, the cure rate may include at least one of a stress reduction rate of the crop, a pathogen reduction rate, and a growth rate associated with a treatment progress. When the recipe recommender 130 provides the user with treatment recipes, the stress reduction rate, pathogen reduction rate, and growth rate may be provided together after being converted into percentage values or plotted on a graph.

The suitability rating of a treatment recipe can be calculated with certain weights applied to the criteria categories. For example, in cases where the disease or pest problem is characterized by rapid contagion within a short period of time, the suitability may be calculated with a higher weight applied to the duration until cure category.

The user can select one of the multiple treatment recipes provided with suitability ratings calculated in the manner described above and apply the selected treatment recipe to the crop experiencing a disease or pest problem.

In this embodiment, the user can access a user terminal or an Internet website to check the treatment recipes and calculated suitability ratings provided by the recipe recommender 130.

In this embodiment, the user terminal can be any one of a laptop computer, smart phone, tablet PC, PDA (personal digital assistant), EDA (enterprise digital assistant), MID (mobile Internet device) and e-book. Besides the devices listed above, the user terminal may be a computer of any form, provided that a display device (such as a monitor installed at the cultivation site 1, for example) capable of showing or outputting the treatment recipes provided by a recipe module 240 is included.

Second Disclosed Embodiment

The second disclosed embodiment further includes the features of periodically collecting the images of the crop to which a treatment recipe is being applied, analyzing the results and deriving treatment results associated with the treatment progress, and evaluating the suitability rating of the treatment recipe based on the derived treatment result and the cultivation environment of the crop, in addition to the features of the first disclosed embodiment.

Below, a platform server 200 for providing disease and pest treatment recipes according to a second disclosed embodiment of the present disclosure is described in detail with reference to the accompanying drawings.

Figure 3:
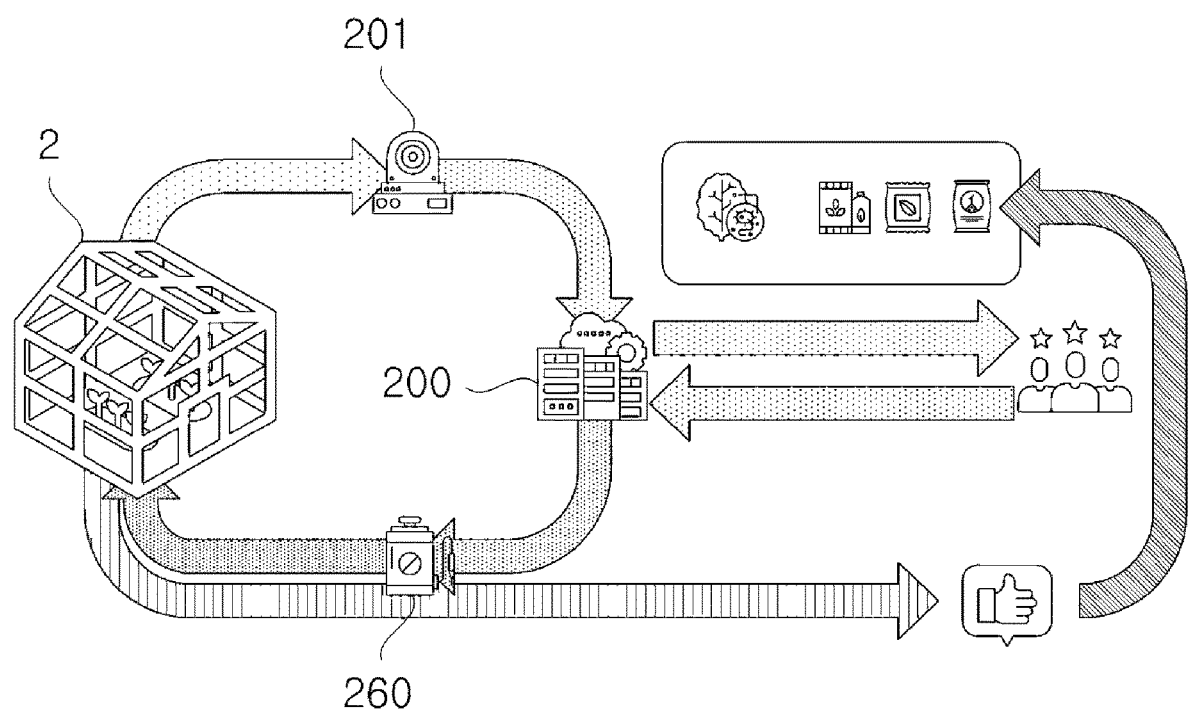
FIG. 3 is a conceptual diagram illustrating a platform server for providing disease and pest treatment recipes according to a second disclosed embodiment of the present disclosure.

FIG. 3 is a conceptual diagram illustrating a platform server 200 for providing disease and pest treatment recipes according to a second disclosed embodiment of the present disclosure.

Referring to FIG. 3, a platform server 200 for providing disease and pest treatment recipes according to the second disclosed embodiment may receive images of a crop and information regarding the cultivation environment of the crop and, based on the images, may identify the type of disease or pest problem and the degree of progression. Based on the identification of the disease or pest problem type and on the information provided regarding the cultivation environment, a multiple number of treatment recipes suitable for treating the disease or pest problem may be searched from a recipe database and provided to the user (customer).

The platform server 200 for providing disease and pest treatment recipes can help the user to easily select an optimal treatment recipe from among the multiple number of treatment recipes by providing a suitability rating, representing suitability in regard to the disease or pest problem that has occurred at the cultivation site 2 and the cultivation environment of the cultivation site 2, together with each treatment recipe. Here, the suitability rating of a treatment recipe may be calculated in consideration of the cultivation environment, cure rate, duration until cure, cost, etc., making it possible to quickly treat a disease or pest problem that has occurred in a crop by using a treatment recipe optimized to the cultivation environment.

The platform server 200 for providing disease and pest treatment recipes may continuously update the treatment recipes and suitability ratings for the treatment recipes stored in the recipe database based on the treatment results obtained after applying the treatment recipes. The treatment recipes and suitability ratings updated by the platform server 200 for providing disease and pest treatment recipes may be accumulated as data for various cultivation environments, and since the treatment recipes are provided with updated suitability ratings when they are provided to other users facing similar disease or pest problems, the user can be provided with high-quality treatment recipes optimized to the cultivation environment.

Figure 4:
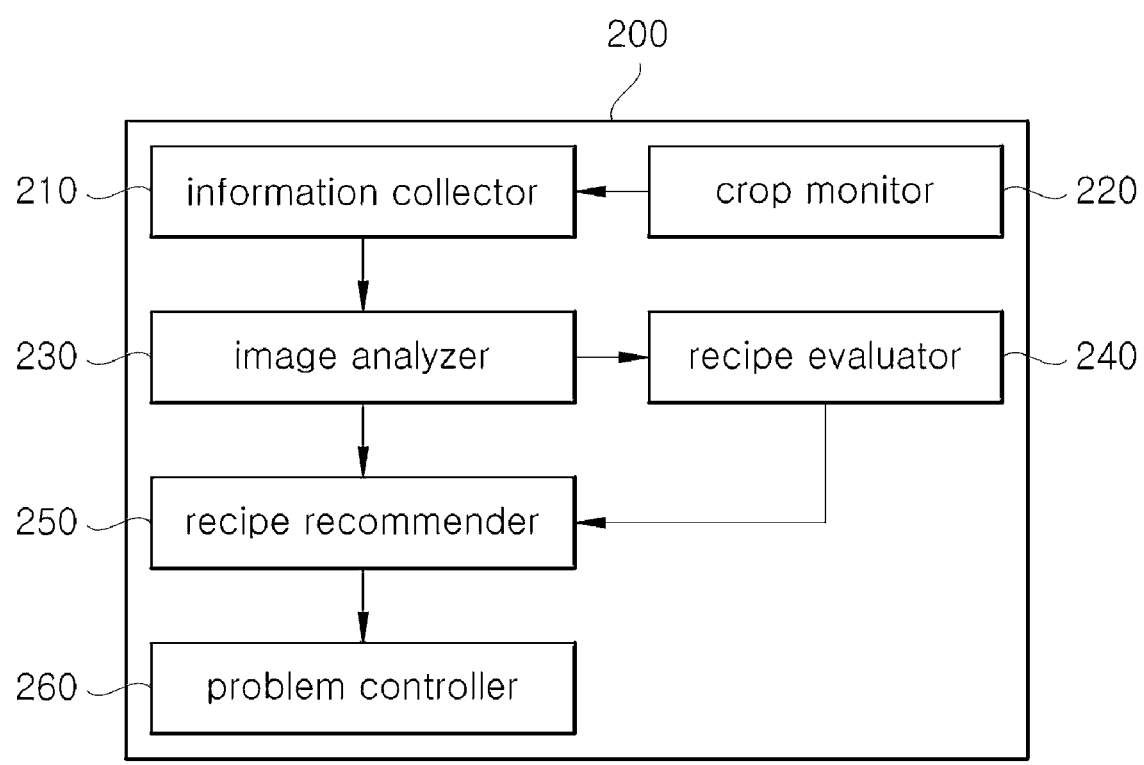
FIG. 4 is a block diagram illustrating the composition of a platform server for providing disease and pest treatment recipes according to the second disclosed embodiment.

FIG. 4 is a block diagram illustrating the composition of a platform server 200 for providing disease and pest treatment recipes according to the second disclosed embodiment.

Referring to FIG. 3 and FIG. 4, a platform server 200 for providing disease and pest treatment recipes according to the second disclosed embodiment may include an information collector 210, a crop monitor 220, an image analyzer 230, a recipe evaluator 240, a recipe recommender 250, and a problem controller 260.

The information collector 210, image analyzer 230, and recipe recommender 250 of the second disclosed embodiment may be substantially the same as the information collector 110, image analyzer 120, and recipe recommender 130 of the first disclosed embodiment and as such will not be described here in further detail.

The problem controller 260 may apply the treatment recipe selected by the user, from among the multiple treatment recipes provided to the user by the recipe recommender 250, to the crop. The problem controller 260 can be implemented in various ways according to the treatment recipe.

For example, if the treatment recipe includes spraying a pesticide, the problem controller 260 may be implemented as a device (not shown) for spraying the pesticide. The problem controller 260 may automatically dilute the pesticide based on the treatment recipe and may spray the diluted pesticide in spraying cycles included in the treatment recipe.

Also, if the treatment recipe includes measures taken to change the luminous flux, air temperature, and humidity of the cultivation environment, the problem controller 260 may be implemented as a light emitter and humidifier. The problem controller 260 may use a light emitter and a humidifier to maintain the cultivation environment at the luminous flux, temperature, and humidity included in the treatment recipe.

The crop monitor 220 may periodically receive images of the crop to which the treatment recipe selected by the user is being applied. For instance, the crop monitor 220 may periodically receive the images of the crop to which the treatment recipe is being applied from camera devices 201 installed at the cultivation site 2. In this embodiment, the images of the crop provided from the camera device 201 to the information collector 210 can again be provided to the crop monitor 220 from the information collector 210, or the crop monitor 220 can receive the images of the crop directly from the camera device 201.

At least one or more camera device 201 can be installed at the cultivation site 2 of the crop, and the camera device 201 may photograph the crop in preconfigured cycles. The camera device 201 can take still images or video clips of the overall crop or a portion of the crop (for example, the front surface of a leaf, the rear surface of a leaf, the stalk, etc.) and can selectively apply any of a variety of filters in photographing the crop.

The recipe evaluator 240 may perform a time series analysis on the images of the crop received from the crop monitor 220 to derive a treatment result associated with the treatment progress. Based on the derived treatment result and the cultivation environment of the crop, the recipe evaluator 240 may evaluate the suitability rating of the treatment recipe stored in the recipe database. The suitability ratings evaluated by the recipe evaluator 240 may be included in the respective treatment recipes to be provided together, when the recipe recommender 250 provides multiple treatment recipes to the user.

The following describes an example of a method by which the recipe evaluator 240 may analyze the treatment result for the treatment progress. The analysis method of the recipe evaluator 240 described below (RNN) is merely an example, and the invention is not limited thus. Besides the RNN, the recipe evaluator 240 can analyze the treatment result by way of an image processing algorithm using an ANN (artificial neural network) such as those using LSTM (long short-term memory), GRUs (gated recurrent units), a GAN (generative adversarial network), and a CNN (convolutional neural network). It is also possible to analyze the treatment result by using a method other than the methods listed above.

The recipe evaluator 240 can perform a time series analysis on the treatment result for a treatment progress of the crop by using a RNN (recurrent neural network), which is an example of an image processing algorithm. Defining time series data as several image frames that form a continuous time series, the time series data is dynamic data of which the length varies and the properties change according to time. To analyze time series data for a long duration of time in particular, the sequence of the data from the starting point of data acquisition to the final time point may have to be identified, but conventional methods using the MLP, CNN, etc., may face limitations in identifying the sequency for time series data of a long duration.

The recipe evaluator 240 can perform time series analysis using a RNN (recurrent neural network), which is an example of an image processing algorithm, on the images of the crop provided by the camera device 201 to overcome the limitations of the conventional MLP and CNN and can analyze the treatment progress and derive treatment results for the crop in an accurate and effective manner. As described above, the recipe evaluator 240 can analyze the treatment results by way of an image processing algorithm using an ANN (artificial neural network) such as those using LSTM (long short-term memory), GRUs (gated recurrent units), a GAN (generative adversarial network), and a CNN (convolutional neural network), besides the RNN.

The treatment result derived at the recipe evaluator 240 may include at least one of a stress reduction rate, a pathogen reduction rate, and a growth rate of the crop experiencing a disease or pest problem.

For instance, the treatment result may be shown with the stress reduction rate, pathogen reduction rate, and growth rate converted into percentage values and displayed after the passage of preconfigured days from the beginning of the treatment. For example, the treatment result may be shown to include values representing changes in the crop, such as a 20% reduction in stress, 30% reduction in pathogens, and 30% growth, after the passage of ten days.

The recipe evaluator 240 may reevaluate the suitability ratings of the treatment recipes stored in the recipe database based on the derived treatment result and the cultivation environment of the crop.

For example, the recipe evaluator 240 may compare the cultivation environment of a treatment recipe stored beforehand in the recipe database with the cultivation environment of a newly derived treatment result and may newly evaluate and apply the suitability rating of the treatment recipe based on the comparison result. Also, if there is no data in the recipe database that has cultivation environment similar to that of the newly derived treatment result, then the treatment result may be stored in the recipe database so as to continuously expand the recipe database.

Afterwards, when providing treatment recipes to another user that faces the same or a similar disease or pest problem for the corresponding crop in the same or a similar environment, the suitability evaluation may be incorporated, so that the updated treatment recipes can be provided with the suitability ratings adjusted automatically for the respective treatment recipes. Here, the treatment recipes provided to another user may be provided together with a report on the treatment result after a treatment recipe was applied, i.e., including information regarding the stress reduction rate, pathogen reduction rate, growth rate, etc.

FIGS. 5A, 5B, 5C, and 5D illustrate examples of how a platform server for providing disease and pest treatment recipes according to the second disclosed embodiment may be implemented by way of an application.

Referring to FIGS. 5A, 5B, 5C, and 5D, a platform server for providing disease and pest treatment recipes can be implemented as software that is installed and run on a user terminal.

Here, the software may refer to an app that is executed on the Android OS by Google LLC or iOS by Apple Inc., operated on a mobile terminal such as a smart phone, tablet PC, etc., or an application program or script program that is executed on a server apparatus or a computing terminal such as a laptop PC, desktop PC, etc., operated on the Windows OS by Microsoft Corporation or the Chrome OS by Google LLC or any other type of computer program that operates similarly to an app, application, or script.

In this embodiment, the user terminal can be any one of a laptop computer, smart phone, tablet PC, PDA (personal digital assistant), EDA (enterprise digital assistant), MID (mobile Internet device) and e-book.

Figure 5A:
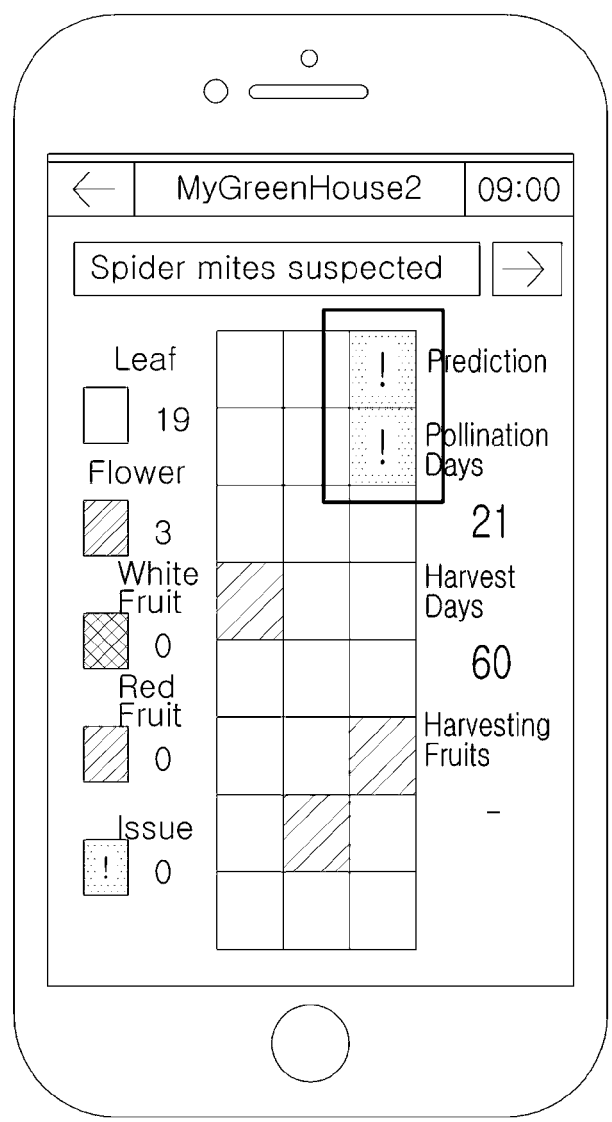
FIG. 5A, FIG. 5B, FIG. 5C, and FIG. 5D illustrate examples of how a platform server for providing disease and pest treatment recipes according to the second disclosed embodiment may be implemented by way of an application.

In the example screen shown in FIG. 5A, the platform server for providing disease and pest treatment recipes may photograph strawberries that are currently being cultivated, analyze the photographed images, and distinguish leaves (Leaf), flowers (Flower), unripe white-colored strawberries (White Fruit), ripe red-colored strawberries (Red Fruit), and abnormal parts (Issue).

The platform server for providing disease and pest treatment recipes may basically analyze the photographed image of the crop and diagnose the disease or pest name for the abnormal parts. In the example screen in FIG. 5A, there are two abnormal parts detected in sectors corresponding to leaf portions from among the overall portions of the strawberries, and more specifically, 'spider mites are suspected.'

Figure 5B:
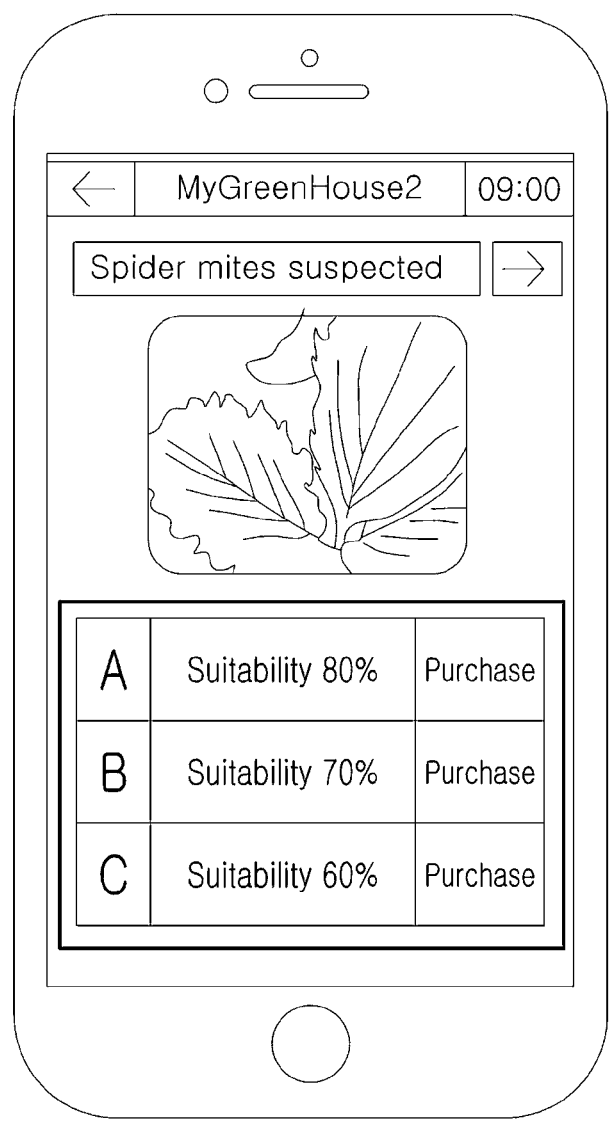

In the example screen of FIG. 5B, the platform server for providing disease and pest treatment recipes may suggest multiple treatment recipes according to the identification result. The example screen of FIG. 5B presents a treatment recipe A of which the suitability rating is estimated as 80%, a treatment recipe B of which the suitability rating is estimated as 70%, and a treatment recipe C of which the suitability rating is estimated as 60%. The suitability rating may represent a result that considers comprehensively the cultivation environment, cure rate, duration until cure, cost, etc., with the result provided as a numerical rating.

When the user selects one of the multiple treatment recipes and applies the corresponding measure to the crop, the platform server for providing disease and pest treatment recipes may continuously monitor the treatment progress of the crop through a camera device and thus collect progress data. That is, the platform server for providing disease and pest treatment recipes may regularly photograph images of the crop, even after the treatment measure selected by the user is applied, to analyze the change in appearance of the corresponding crop effected by the treatment.

Figure 5C:
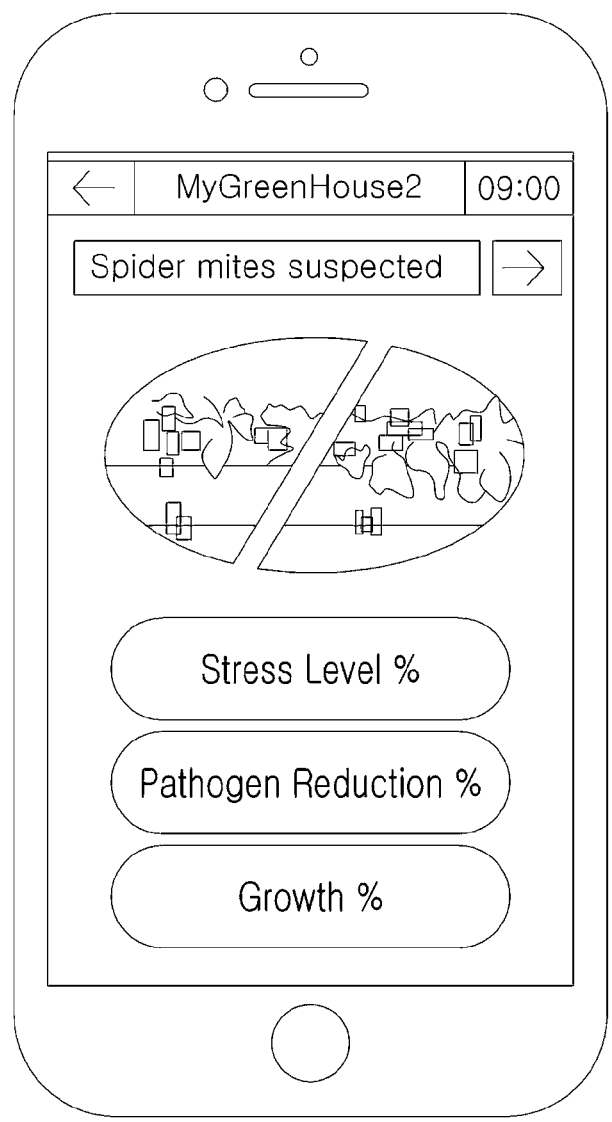

The example screen of FIG. 5C illustrates a case in which the user has selected treatment measure B (or product B) and applied the corresponding treatment measure to the strawberries showing symptoms of spider mites. The platform server for providing disease and pest treatment recipes may continuously photograph images of the strawberries, analyze the images, and analyze the results of the treatment measure B through various methods. For example, the platform server may analyze the progress of the treatment measure B by showing "stress level reduced x %, pathogen reduced x %, growth x %", etc.

Such treatment progress information, together with environment information including air temperature, humidity, pH, $CO_2$ concentration, etc., crop information including the variety, growth phase, etc., of the crop, and problem information including the type of disease or pest problem, problem phase, etc., can be collectively analyzed by the platform server for providing disease and pest treatment recipes and reported to the user or other users of the platform server for providing disease and pest treatment recipes as a suitability evaluation of the corresponding treatment recipe.

Figure 5D:
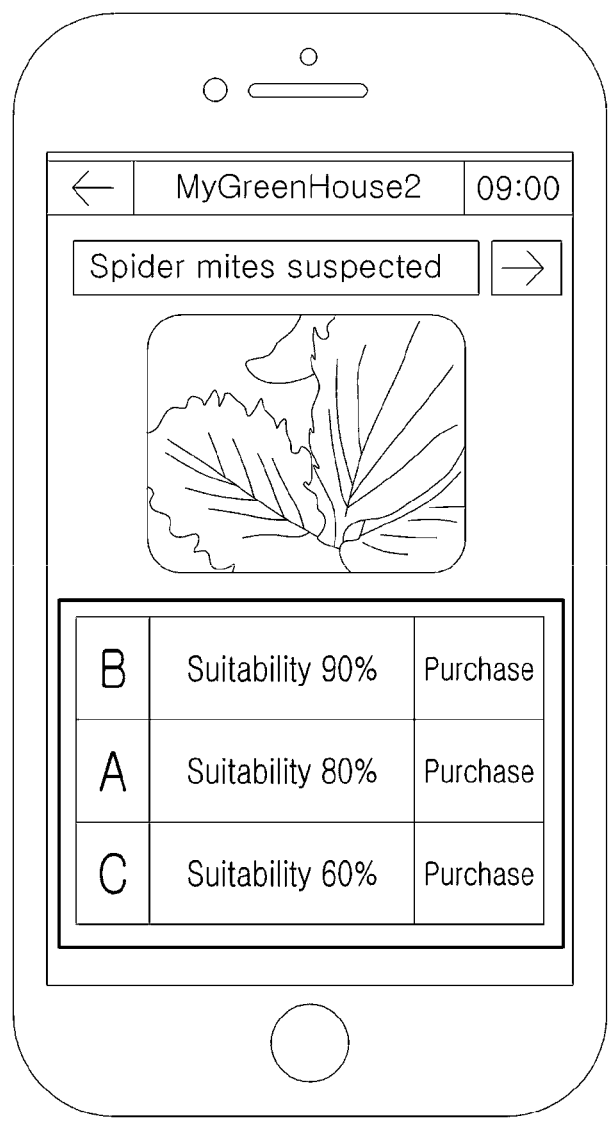

Afterwards, when treatment recipes are provided to another user facing the same or a similar disease or pest problem for the corresponding crop in the same or a similar environment, the suitability evaluation may be incorporated, as in the screen example of FIG. 5D, and an updated list of treatment recipes can be provided with the suitability rating of each treatment measure adjusted automatically.

Third Disclosed Embodiment

The third disclosed embodiment relates to a method for providing disease and pest treatment recipes performed by the platform server 200 for providing disease and pest treatment recipes according to the second disclosed embodiment.

The platform server used in the method for providing disease and pest treatment recipes described below can be implemented as software that is installed and run on a user terminal.

Figure 6:
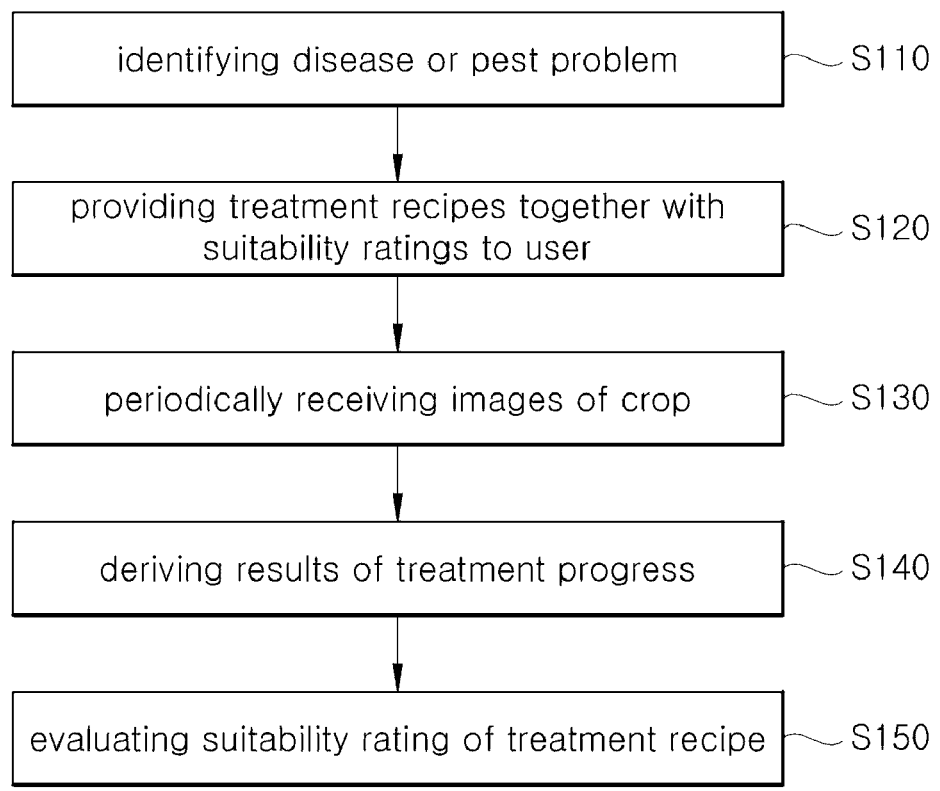
FIG. 6 is a flow diagram illustrating a method for providing disease and pest treatment recipes according to a third disclosed embodiment of the present disclosure.

FIG. 6 is a flow diagram illustrating a method for providing disease and pest treatment recipes according to a third disclosed embodiment of the present disclosure.

A method for providing disease and pest treatment recipes according to the third disclosed embodiment may include identifying a disease or pest problem (operation S110), providing treatment recipes together with suitability ratings to the user (operation S120), periodically receiving images of the crop (operation S130), deriving the treatment progress (operation S140), and evaluating the suitability rating of the treatment recipe (operation S150).

The operation of identifying a disease or pest problem (operation S110) may involve the platform server receiving an image of the crop and information on the cultivation environment and identifying a disease or pest problem based on the image of the crop.

First, in identifying a disease or pest problem (operation S110), the platform server may receive an image of the crop from a camera device installed at the cultivation site.

At least one or more camera device may be installed at the cultivation site of the crop, and the camera device may photograph the crop in preconfigured cycles. The camera device may take a still image or a video clip of the overall crop or a portion of the crop (for example, the front surface of a leaf, the rear surface of a leaf, the stalk, etc.). The camera device can selectively apply any of a variety of filters in photographing the crop.

The following provides examples of methods that the camera device may use for photographing the crop.

The camera device may photograph the crop by using at least one image sensor of an RGB sensor, a thermal imaging sensor, a CCD sensor, and a multispectral sensor.

An RGB sensor may combine red, green, and blue colors to express an image, a thermal imaging sensor may show a subject using different colors to represent different temperatures, and a CCD sensor may obtain an image by converting light to electrical charges. A multispectral sensor may obtain images in generally ten or fewer discontinuous bands within the visible ray and infrared regions, and since the bands are stored separately in the data, an independent set of data may be generated for each pixel.

The camera device and the platform server can exchange signals using near-field communication such as Bluetooth, Wi-Fi, Zigbee, etc., or broadband wireless communication such as LoRa, 4G LTE, 5G mobile communication, etc.

The platform server may receive information on the cultivation environment at the cultivation site where the crop is being cultivated. Here, the information regarding the cultivation environment may include at least one of the number of days since sowing, a designation regarding soil cultivation or water cultivation, the acidity (pH) of the soil, the humidity of the soil, the composition of the culture solution, the concentration of the culture solution, the acidity (pH) of the culture solution, the luminous flux, the illuminance, the optical wavelengths, the temperature of the atmosphere, the humidity of the atmosphere, and the ventilated air volume.

One reason for the platform server receiving the information regarding the cultivation environment at the cultivation site is to provide treatment methods that are optimized to the cultivation environment of the user by providing treatment recipes that are applied in environments most similar to the cultivation environment of the user.

The platform server can receive information on the cultivation environment such as the above from various sensors installed at the cultivation site. For example, at least one of a temperature sensor, humidity sensor, optical sensor, gas sensor, and soil sensor may be installed at the cultivation site, and the information on the cultivation environment may be received from these sensors. Although this embodiment is described with the platform server basically receiving information regarding the cultivation environment via various sensors, it is also possible for the platform server to receive the information of the cultivation environment (such as the temperature and humidity at the cultivation site, for example) based on data inputted directly by the user.

Upon receiving the image of the crop and the information on the cultivation environment, the platform server may identify the type of disease or pest problem based on the image of the crop.

For instance, the platform server may determine the type of disease or pest problem and the degree of progression by using an image analysis algorithm or by comparing with pre-stored image data of the crop in a normal state. However, the method by which the platform server determines the type of disease or pest problem and the degree of progression is not limited to the above.

The operation of providing treatment recipes together with suitability ratings to the user (operation S120) may involve the platform server searching multiple treatment recipes from a recipe database, based on the identified type and progression of the disease or pest problem and on the cultivation environment, and providing the user with the multiple searched treatment recipes together with their suitability ratings.

One reason for the platform server searching for multiple treatment recipes from the recipe database based on the type and progression of the disease or pest problem and on the information regarding the cultivation environment is because, even when the same chemical (such as a pesticide, for example) is used for the same type of disease or pest problem at the same degree of progression, the efficacy and effectiveness of the chemical included in treatment recipes can vary according to the cultivation environment, i.e., the type of cultivation (soil cultivation or water cultivation), the acidity (pH) of the soil, the humidity of the soil, the composition of the culture solution, the concentration of the culture solution, the acidity (pH) of the culture solution, the luminous flux, the illuminance, the optical wavelengths, the temperature of the atmosphere, the humidity of the atmosphere, and the ventilated air volume.

In order to optimize the effect of the treatment recipe, the platform server may search multiple treatment recipes that were used to cure disease or pest problems in environments similar to the corresponding cultivation environment from the recipe database.

In this embodiment, the treatment recipes may include at least one of a physical treatment method, a biological treatment method, and a chemical treatment method.

A physical treatment method includes adjusting at least one of the temperature, humidity, luminous flux, optical wavelengths, and ventilation cycle at the cultivation site 1. For example, a physical treatment method may present the optimal temperature for a disease or pest problem for cases in which the disease or pest problem is vulnerable to temperatures of a certain range.

A biological treatment method may include at least one of installing a screening, installing pheromone traps, introducing natural enemies or pest-repelling plants. A biological treatment method may entail blocking pests from approaching or luring pests to another location for eradication. For example, a screening can be installed around a crop to block pests from approaching, where a pest repellent can be coated on the exterior of the screening. A pheromone trap may be a device that uses a pheromone substance to lure and trap pests. A suitable pheromone trap can be used according to the behaviors of the targeted pest.

A chemical treatment method may include adjusting at least one of using a chemical, pesticide, fertilizer, or any of a variety of other agrochemical products, spraying an environment-friendly agent, and adjusting soil pH. A chemical treatment method may use a chemical, pesticide, fertilizer, or other agrochemical product or adjust the soil pH to directly remove a disease or pest problem or create an environment in which the disease or pest cannot survive. Although the present embodiment is described using chemical treatment methods, from among the types of treatment methods listed above, as a basic example, it is not necessary that only chemical treatment methods be used.

The platform server may rate suitability ratings and provide these to the user by comparing the cultivation environment in which the crop to be treated for a disease or pest problem is planted with the cultivation environment in which each of the multiple searched treatment recipes was used.

For example, according to the disease or pest problem that has occurred in a crop and according to the cultivation environment, a first treatment recipe having a suitability rating of 70%, a second treatment recipe having a suitability rating of 75%, and a third treatment recipe having a suitability rating of 85% may be provided. Here, the treatment recipes can have their suitability ratings calculated differently, as the first treatment recipe includes a physical treatment method, and the second treatment recipe includes a chemical treatment method. Whereas the disease or pest problem that has occurred in the corresponding crop can be cured by applying the first treatment recipe of adjusting the temperature and humidity, in a case where the disease or pest problem has a high speed of contagion, the suitability rating of the second treatment recipe including a chemical treatment method may be calculated higher than that of the first treatment recipe including a physical treatment method due to the need for a quick countermeasure.

Thus, by providing treatment recipes with the suitability ratings included, the platform server can provide treatment recipes optimized to the cultivation environment and to the treatment of the disease or pest problem.

The suitability ratings of the treatment recipes provided to the user from the platform server may be calculated based on criteria categories including at least one of the cultivation environment, a cure rate, a duration until cure, and a cost.

For instance, when the cure rate is a criterion category, a treatment recipe having the highest cure rate from among multiple treatment recipes may not necessarily have the highest suitability rating. For example, in cases where a cure rate maintained up to 80% allows self healing even without further use of a chemical, a treatment recipe having a cure rate of 80% can have a higher suitability rating than a treatment recipe having a cure rate of 85%. In this embodiment, the cure rate may include at least one of a stress reduction rate of the crop, a pathogen reduction rate, and a growth rate associated with a treatment progress. When the platform server provides the user with treatment recipes, the stress reduction rate, pathogen reduction rate, and growth rate may be provided together after being converted into percentage values or plotted on a graph.

The suitability rating of a treatment recipe can be calculated with certain weights applied to the criteria categories. For example, in cases where the disease or pest problem is characterized by rapid contagion within a short period of time, the suitability may be calculated with a higher weight applied to the duration until cure category.

The user can select one of the multiple treatment recipes provided with suitability ratings calculated in the manner described above and apply the selected treatment recipe to the crop experiencing a disease or pest problem.

In this embodiment, the user can access a user terminal or an Internet website to check the treatment recipes and calculated suitability ratings provided by the platform server.

In this embodiment, the user terminal can be any one of a laptop computer, smart phone, tablet PC, PDA (personal digital assistant), EDA (enterprise digital assistant), MID (mobile Internet device) and e-book. Besides the devices listed above, the user terminal may be a computer of any form, provided that a display device (such as a monitor installed at the cultivation site, for example) capable of showing or outputting the treatment recipes provided by the platform server is included.

The operation of periodically receiving images of the crop (operation S130) may involve the platform server periodically receiving images of the crop to which the treatment recipe selected by the user is being applied.

For instance, in periodically receiving the images of the crop (operation S130), the platform server may periodically receive images of the crop to which the treatment recipe is being applied from a camera device 201 installed at the cultivation site 2.

The operation of deriving the treatment progress (operation S140) may involve the platform server performing a time series analysis of the received images of the crop to derive the results of the treatment progress.

The following describes an example of a method by which the platform server may analyze the treatment result for the treatment progress. The analysis method of the platform server described below (RNN) is merely an example, and the invention is not limited thus. Besides the RNN, the platform server can analyze the treatment result by way of an image processing algorithm using an ANN (artificial neural network) such as those using LSTM (long short-term memory), GRUs (gated recurrent units), a GAN (generative adversarial network), and a CNN (convolutional neural network). It is also possible to analyze the treatment result by using a method other than the methods listed above.

The platform server can perform a time series analysis on the treatment result for a treatment progress of the crop by using a RNN (recurrent neural network), which is an example of an image processing algorithm. Defining time series data as several image frames that form a continuous time series, the time series data is dynamic data of which the length varies and the properties change according to time. To analyze time series data for a long duration of time in particular, the sequence of the data from the starting point of data acquisition to the final time point may have to be identified, but conventional methods using the MLP, CNN, etc., may face limitations in identifying the sequency for time series data of a long duration.

The platform server can perform time series analysis using a RNN (recurrent neural network), which is an example of an image processing algorithm, on the images of the crop provided by the camera device to overcome the limitations of the conventional MLP and CNN and can analyze the treatment progress and derive treatment results for the crop in an accurate and effective manner. As described above, the platform server can analyze the treatment results by way of an image processing algorithm using an ANN (artificial neural network) such as those using LSTM (long short-term memory), GRUs (gated recurrent units), a GAN (generative adversarial network), and a CNN (convolutional neural network), besides the RNN.

The treatment result derived at the platform server may include at least one of a stress reduction rate, a pathogen reduction rate, and a growth rate of the crop experiencing a disease or pest problem.

For instance, the treatment result may be shown with the stress reduction rate, pathogen reduction rate, and growth rate converted into percentage values and displayed after the passage of preconfigured days from the beginning of the treatment. For example, the treatment result may be shown to include values representing changes in the crop, such as a 20% reduction in stress, 30% reduction in pathogens, and 30% growth, after the passage of ten days.

The operation of evaluating the suitability rating of the treatment recipe (operation S150) may involve the platform server evaluating the suitability rating of the treatment recipe stored in the recipe database based on the derived treatment result and the cultivation environment of the crop.

For example, the platform server may compare the cultivation environment of a treatment recipe stored beforehand in the recipe database with the cultivation environment of a newly derived treatment result and may newly evaluate and apply the suitability rating of the treatment recipe based on the comparison result. Also, if there is no data in the recipe database that has cultivation environment similar to that of the newly derived treatment result, then the treatment result may be stored in the recipe database so as to continuously expand the recipe database.

The treatment recipe evaluated by the platform server based on the derived treatment result and stored in the recipe database as described above may be drafted in the form of a report when provided by the platform server to another user. Here, the treatment recipes provided to another user may also include the stress reduction rate, pathogen reduction rate, and growth rate observed when the treatment recipe was applied to a crop.

While the present disclosure is described above with reference to certain embodiments, the person having ordinary skill in the relevant field of art would understand that numerous variations and modifications of the present disclosure can be derived without departing from the spirit and scope of the present disclosure set forth in the scope of claims below.

What is claimed is:

1. A system for providing disease and pest treatment recipes for a crop at a cultivation site, the system comprising:
   a database storing
      information on a plurality of disease or pest that occur on the crop and a plurality of previously-used recipes, each of which was previously used to cure at least one of the plurality of disease or pest in a variety of cultivation environments, wherein each of the plurality of previously-used recipes includes at least one of a manufacturer, a brand name, a dilution rate a dosage amount, and a dosage period of a chemical or fertilizer,
      correlation information between the plurality of previously-used recipes and information on the variety of cultivation environments:
   an information collector configured to receive an image of a crop and information on cultivation environment of the cultivation site,
      wherein the information collector includes a camera installed at the cultivation site and the camera is configured to capture the image of the crop including images of a front and rear surfaces of a leaf of the crop and a stalk of the crop;
   an image analyzer configured to identify a current disease or pest problem from among the plurality of disease or pest, currently occurring on the crop, based on the image of the crop; and
   a recipe recommender configured to
      perform a searching function to search a candidate list of two or more treatment recipes which cure the identified current disease or pest from among the previously-used treatment recipes previously used in a similar cultivation environment to the cultivation environment of the cultivation site, and
      perform a calculation function to calculate a suitability rating score of each of the candidate list of the two or more treatment recipes using similarity comparison between the received information on the cultivation environment of the cultivation site and the stored information on the variety of cultivation environments, the correlation information, cure rate of each of the candidate list of the two or more treatment recipes, and contagion speed of the identified current disease or pest;
   a display configured to display a name of the identified current disease or pest, the candidate list of the two or more treatment recipes along with corresponding suitability rating scores of the candidate list of the two or more treatment recipes;
   a crop monitor configured to periodically receive images of the crop to which a user-selected treatment recipe selected by the user from among the candidate list of the two or more treatment recipes is being applied; and
   a recipe evaluator configured to
      derive a treatment result in relation to application of the user-selected treatment recipe to the crop, by way of a time series analysis of the images of the crop, and
      evaluate and update a suitability rating score of the user-selected treatment recipe from among the candidate list of the two or more treatment recipes based on the derived treatment result and the information on the cultivation environment of the crop,
   wherein, after the recipe evaluator updates a suitability rating score of the user-selected treatment recipe the recipe recommender performs the searching function and the calculation function again, and the display displays the candidate list of the two or more treatment recipes along with corresponding updated suitability rating scores,
   wherein the information on the cultivation environment includes at least one of a number of days since sowing, a designation regarding soil cultivation or water cultivation, an acidity (pH) of a soil, a humidity of a soil, a composition of a culture solution, a concentration of a culture solution, an acidity (pH) of a culture solution, a luminous flux, an illuminance, an optical wavelength, a temperature of an atmosphere, a humidity of an atmosphere, and a ventilated air volume of the cultivation site.

2. The system according to claim 1, wherein the treatment result includes at least one of a stress reduction rate, a pathogen reduction rate, and a growth rate of the crop experiencing a disease or pest problem.

3. The system according to claim 1, wherein the suitability rating score of the treatment recipe is calculated based on criteria categories including a cure rate, a duration until cure, and a cost, and weights are applied to the criteria categories.

4. A system for providing disease and pest treatment recipes for a crop at a cultivation site, the system comprising:
   a database storing
      information on a plurality of disease or pest that occur on the crop and a plurality of previously-used recipes, each of which was previously used to cure at least one of the plurality of disease or pest in a variety of cultivation environments, wherein each of the plurality of previously-used recipes includes at least one of a manufacturer, a brand name, a dilution rate, a dosage amount, and a dosage period of a chemical or fertilizer,
      correlation information between the plurality of previously-used recipes and information on the variety of cultivation environments;
   an information collector configured to receive an image of a crop and information on cultivation environment of the cultivation site;
      wherein the information collector includes a camera installed at the cultivation site, and the camera is configured to capture the image of the crop including images of a front and rear surfaces of a leaf of the crop and a stalk of the crop;
   an image analyzer configured to identify a current disease or pest from among the plurality of disease or pest, currently occurring on the crop, based on the image of the crop;
   a recipe recommender configured to
      perform a searching function to search a candidate list of two or more treatment recipes which cure the identified current disease or pest from among the previously-used treatment recipes previously used in a similar cultivation environment to the cultivation environment of the cultivation site, perform a calculation function to calculate a suitability rating score of each of the candidate list of the two or more treatment recipes using similarity comparison between the received information on the cultivation environment of the cultivation site and the stored information on the variety of cultivation environments, the correlation information, cure rate of each of the candidate list of the two or more treatment recipes, and contagion speed of the identified current disease or pest, and provide a name of the identified current disease or pest, the candidate list of the two or more treatment recipes along with corresponding suitability rating scores of the candidate list of the two or more treatment recipes to a user;

a problem controller configured to apply, to the crop, a user-selected treatment recipe selected by the user from among the candidate list of the two or more treatment recipes provided to the user;

a crop monitor configured to periodically receive images of the crop to which the user-selected treatment recipe selected by the user from among the candidate list of the two or more treatment recipes is being applied; and a recipe evaluator configured to derive a treatment result in relation to application of the user-selected treatment recipe to the crop, by way of a time series analysis of the images of the crop, and evaluate and update a suitability rating score of the user-selected treatment recipe from among the candidate list of the two or more treatment recipes based on the derived treatment result and the information on the cultivation environment of the crop, wherein, after the recipe evaluator updates a suitability rating score of the user-selected treatment recipe, the recipe recommender performs the searching function and the calculation function again, and the display displays the candidate list of the two or more treatment recipes along with corresponding updated suitability rating scores, wherein the information on the cultivation environment includes at least one of a number of days since sowing, a designation regarding soil cultivation or water cultivation, an acidity (pH) of a soil, a humidity of a soil, a composition of a culture solution, a concentration of a culture solution, an acidity (pH) of a culture solution, a luminous flux, an illuminance, an optical wavelength, a temperature of an atmosphere, a humidity of an atmosphere, and a ventilated air volume of the cultivation site.

5. The system according to claim 4, wherein the treatment result includes at least one of a stress reduction rate, a pathogen reduction rate, and a growth rate of the crop experiencing a disease or pest problem.

6. The system according to claim 4, wherein the suitability rating score of the treatment recipe is calculated based on criteria categories including a cure rate, a duration until cure, and a cost, and weights are applied to the criteria categories.

7. A method for providing disease and pest treatment recipes for a crop at a cultivation site performed by a system, the system comprising a database storing (i) information on a plurality of disease or pest that occur on the crop and a plurality of previously-used recipes, each of which was previously used to cure at least one of the plurality of disease or pest in a variety of cultivation environments, wherein each of the plurality of previously-used recipes includes at least one of a manufacturer, a brand name, a dilution rate, a dosage amount, and a dosage period of a chemical or fertilizer; (ii) correlation information between the plurality of previously-used recipes and information on the variety of cultivation environments, the method comprising:

receiving by an information collector an image of a crop and information on cultivation environment of the cultivation site, wherein the information collector includes a camera installed at the cultivation site, and the image of the crop includes images of a front and rear surfaces of a leaf of the crop and a stalk of the crop captured by the camera; and identifying by an image analyzer a current disease or pest from among the plurality of disease or pest, currently occurring on the crop, based on the image of the crop;

searching, by a recipe recommender a candidate list of two or more treatment recipes which cure the identified current disease or pest from among the previously-used treatment recipes previously used in a similar cultivation environment to the cultivation environment of the cultivation site, calculating, by the recipe recommender, a suitability rating score of each of the candidate list of the two or more treatment recipes using similarity comparison between the received information on the cultivation environment of the cultivation site and the stored information on the variety of cultivation environments, the correlation information, cure rate of each of the candidate list of the two or more treatment recipes, and contagion speed of the identified current disease or pest, and displaying, via a display, a name of the identified current disease or pest, the candidate list of the two or more treatment recipes along with corresponding suitability rating scores of the candidate list of the two or more treatment recipes to a user;

periodically receiving, by a crop monitor, images of the crop to which a user-selected treatment recipe selected by the user from among the candidate list of the two or more treatment recipes is being applied;

deriving by a recipe evaluator, a treatment result in relation to application of the user-selected treatment recipe to the crop, by way of a time series analysis of the images of the crop; and evaluating and updating by the recipe evaluator, a suitability rating score of the user-selected treatment recipe from among the candidate list of the two or more treatment recipes based on the derived treatment result and the information on the cultivation environment of the crop, wherein, after the updating a suitability rating score of the user-selected treatment recipe, the searching and the calculating are performed again by the recipe recommender, and the candidate list of the two or more treatment recipes along with corresponding updated suitability rating scores are displayed by the display, wherein the information on the cultivation environment includes at least one of a number of days since sowing, a designation regarding soil cultivation or water cultivation, an acidity (pH) of a soil, a humidity of a soil, a composition of a culture solution, a concentration of a culture solution, an acidity (pH) of a culture solution, a luminous flux, an illuminance, an optical wavelength, a temperature of an atmosphere, a humidity of an atmosphere, and a ventilated air volume of the cultivation site.

8. The method according to claim 7, wherein the treatment result includes at least one of a stress reduction rate, a pathogen reduction rate, and a growth rate of the crop experiencing a disease or pest problem.

9. The method according to claim 7, wherein the suitability rating score of the treatment recipe is calculated based on criteria categories including a cure rate, a duration until cure, and a cost, and weights are applied to the criteria categories.

\* \* \* \* \*